(12) United States Patent
Walters

(10) Patent No.: US 11,712,670 B2
(45) Date of Patent: Aug. 1, 2023

(54) MIXING PADDLE

(71) Applicant: Francis Walters, Orlando, FL (US)

(72) Inventor: Francis Walters, Orlando, FL (US)

( * ) Notice: Subject to any disclaimer, the term of this patent is extended or adjusted under 35 U.S.C. 154(b) by 0 days.

(21) Appl. No.: 17/676,171

(22) Filed: Feb. 20, 2022

(65) Prior Publication Data

US 2022/0168698 A1 Jun. 2, 2022

Related U.S. Application Data

(63) Continuation of application No. 16/930,360, filed on Jul. 16, 2020, now Pat. No. 11,253,825.

(60) Provisional application No. 62/879,842, filed on Jul. 29, 2019.

(51) Int. Cl.
*B01F 27/1125* (2022.01)
*A21C 1/14* (2006.01)
*B01F 27/053* (2022.01)
*B01F 101/08* (2022.01)

(52) U.S. Cl.
CPC ............ *B01F 27/1125* (2022.01); *A21C 1/14* (2013.01); *B01F 27/053* (2022.01); *B01F 2101/08* (2022.01); *B01F 2215/0422* (2013.01)

(58) Field of Classification Search
CPC ........ B01F 2101/08; B01F 27/13; A21C 1/02; A21C 1/141; A21C 1/1405
USPC .......................................................... D7/412
See application file for complete search history.

(56) References Cited

U.S. PATENT DOCUMENTS 1,036,489 A * 8/1912 Hall ...................... B02C 17/161
366/98
1,562,704 A * 11/1925 Kevan ................... B01F 27/805
475/11

* cited by examiner

*Primary Examiner* — Elizabeth Insler
(74) *Attorney, Agent, or Firm* — The Concept Law Group, PA; Scott D. Smiley; Scott M. Garrett

(57) ABSTRACT

A mixing paddle specifically designed to produce pastry dough is disclosed. The mixing paddle is comprised of a shaft, a rim, a first plurality of parallel blades and a second plurality of parallel blades. The shaft bisects the rim, creating a first side and a second side. The first plurality of parallel blades is perpendicular to the second plurality of parallel blades.

19 Claims, 9 Drawing Sheets

MIXING PADDLE

CLAIM OF PRIORITY

This U.S. utility patent application is a continuation of U.S. utility patent application Ser. No. 16/930,360, which was filed Jul. 16, 2020, and which claimed priority to U.S. provisional application No. 62/879,842, filed Jul. 29, 2019.

FIELD OF INVENTION

This invention relates to the classifications for baking; equipment for making or processing doughs; and to one or more sub-classifications relating to structural elements of mixing or kneading machines. Specifically, this invention is a mixing paddle for use with a mixing machine.

BACKGROUND OF INVENTION

Traditionally, a baker mixes pie crust dough by pressing a pastry cutter against the bottom of a mixing bowl to cut butter and shortening into flour and other dry ingredients. The resulting mixture should have roughly pea-sized lumps of fat distributed evenly throughout the dry ingredients. This is usually achieved by repeatedly rotating a parallel-bladed pastry cutter to different positions, pressing the cutter into the ingredients, then briefly stirring the mix. Hand-mixing cold butter into flour with a pastry cutter can be time-consuming and exhausting.

Optimum cutter blade spacing is crucial to obtaining a proper mix. A pastry cutter with blades that are too far apart leaves oversized, poorly distributed lumps. Blades that are too close together tend to clog and create lumps that are too small to produce a flaky crust. Wire cutters mix poorly and often fail to conform to the contours of a mixing bowl. Mixing machines equipped with standard mixing paddles or dough hooks do little more than push ingredients around a mixing bowl.

Some people avoid the difficulties of making pie crust by purchasing pre-made crusts from stores. However, most people prefer fresh pie crust made to a favorite recipe, no matter how tedious and difficult it is to create. A mixing machine attachment that effectively cuts butter and shortening into dry ingredients would ease and simplify creation of homemade pie crust.

SUMMARY OF THE INVENTION

This summary is intended to disclose the present invention, a novel mixing paddle. Embodiments of the invention are presented to illustrate and inform one skilled in the art. The mixing paddle is an attachment to a standard mixing machine. It allows a user to cut cold butter and shortening into a flour and dry ingredient mixture. Additionally, the attachment can be used to whip cream quickly and to efficiently mix thick batters, cookie doughs, and other hard-to-mix ingredients. The attachment may be compatible with any type of food mixing machine.

The mixing paddle has a compound, integral center shaft that bisects a rim. In one embodiment, the compound, integral center shaft bisects the rim into two substantially equal halves. In the preferred embodiment, the compound, integral center shaft is comprised of a flange, a collar, a frustoconical member, and a spine. The compound, integral center shaft has a top and a bottom. The top of the compound, integral center shaft is called the flange and collar, and it has a mating opening to accept the beater shaft of a mixing machine. The frustoconical member transitions the compound, integral center shaft from the collar to the spine. The spine is a long, thin structural member that extends to the bottom of the compound, integral center shaft.

The flange and collar of the compound, integral center shaft accepts the mating element from the beater shaft of the mixing machine. The beater shaft can be locked in place with a lock nut. When the beater shaft of the mixing machine rotates, the mixing paddle rotates about the compound, integral center shaft. The mixing paddle is placed in a standard mixing bowl compatible with the mixing machine. One or more flange supports connect the flange to the rim, creating structural rigidity. The flange and collar represent a generalized form that may in alternate embodiments include holes, splines, additional flanges and other structures known in the art to be suitable for attaching the mixing paddle to a beater shaft of a stand mixer, or to a hand mixer or other mixing device.

The rim is formed from piece-wise members that are thin, flat, and wide. The rim is symmetrical about the compound, integral center shaft. When viewed from the front, this embodiment resembles a scutiform or shield. Other common shapes include partial Reuleaux triangles (triangles with rounded sides) and inverted arches, although the shape of the rim is unimportant. The rim merely needs to conform to the sides of a standard mixing bowl used with a stand mixer or hand mixer. The rim has two sides disposed opposite one another on each side of the compound, integral center shaft. For the sake of reference, the first side is to the right of the compound, integral center shaft and the second side is to the left of the compound, integral center shaft. This nomenclature is arbitrary and may be easily reversed.

The rim has two substantially lateral members disposed opposite one another about, and connecting to, the top of the compound, integral center shaft. The rim connects to the compound, integral center shaft at the intersection of the collar and the frustoconical member. Each of the substantially lateral members is also connected to a filleted transition member. Each of the filleted transition members is also connected to a curved member. The two curved members join together at the bottom of the compound, integral center shaft. The two curved members are contoured to match the sides of a standard mixing bowl.

A first plurality of parallel blades are disposed to the right of the compound, integral center shaft, between the compound, integral center shaft and the first side of the rim. A second plurality of parallel blades are disposed to the left of the compound, integral center shaft, between the compound, integral center shaft and the second side of the rim. Each of the first plurality of parallel blades are parallel to one another. Each of the second plurality of parallel blades are parallel to one another. Each of the first plurality of parallel blades is attached to the first side of the rim, between the first side of the rim and the compound, integral center shaft. Each of the second plurality of parallel blades is attached to the second side of the rim, between the second side of the rim and the compound, integral center shaft. In the preferred embodiment, the first plurality of parallel blades is located exactly across the compound, integral center shaft from the second plurality of parallel blades, and is not offset towards the top or the bottom of the compound, integral center shaft when compared to the second plurality of parallel blades. The first plurality of parallel blades may be offset compared to the second plurality of parallel blades, but doing so will affect the uniformity of the fat chunks. If varied fat chunks are desired, the first plurality of parallel blades should be offset relative to the second plurality of parallel blades.

The blades of the first plurality of parallel blades are substantially orthogonal to the blades of the second plurality of parallel blades. The first plurality of parallel blades creates an angle with the compound, integral center shaft. This angle can be anywhere between zero degrees (indicating the first plurality of parallel blades is parallel to the compound, integral center shaft) and 180° (also indicating the first plurality of parallel blades is parallel to the compound, integral center shaft). This angle can be acute, orthogonal, or obtuse. When this angle is 0° or 180°, the second plurality of parallel blades is attached to both the second side of the rim and to the compound, integral center shaft. When this angle is 90°, the first plurality of parallel blades is attached to both the first side of the rim and to the compound, integral center shaft. When this angle is acute or obtuse, both the first and second plurality of parallel blades are attached to both the rim and the compound, integral center shaft.

In the preferred embodiment, the definable spacing of the blades in the first plurality of parallel blades is uniform, although the blade spacing may be non-uniform. Likewise, in the preferred embodiment, the definable spacing of the blades in the second plurality of parallel blades is uniform, although the blade spacing may be non-uniform. Non-uniform blade spacing will once again affect the uniformity of fat chunks. Regardless of whether the blade spacing is uniform or non-uniform, the spacing between the blades should ideally be between 6 mm and 13 mm. The edge of the blades may be uniform, tapered, or roughened.

The mixing paddle is ideally integrally fabricated from a rigid material that resists oxidation, acids, and bases, such as stainless steel, aluminum, zinc, magnesium, or a structural plastic such as acrylonitrile butadience styrene ("ABS"), polycarbonate ("PC"), polypropylene ("PP"), polyamides ("nylon"), high-density polyethylene ("HDPE"), and polyvinyl chloride ("PVC"). The material should not leach into the dough.

BRIEF DESCRIPTION OF THE DRAWINGS

The present invention is illustrated with 9 drawings on 9 sheets. The accompanying drawings, which are incorporated in and constitute a part of this disclosure, illustrate various example embodiments. In the drawings.

DETAILED DESCRIPTION OF THE DRAWINGS

Figure 1A:
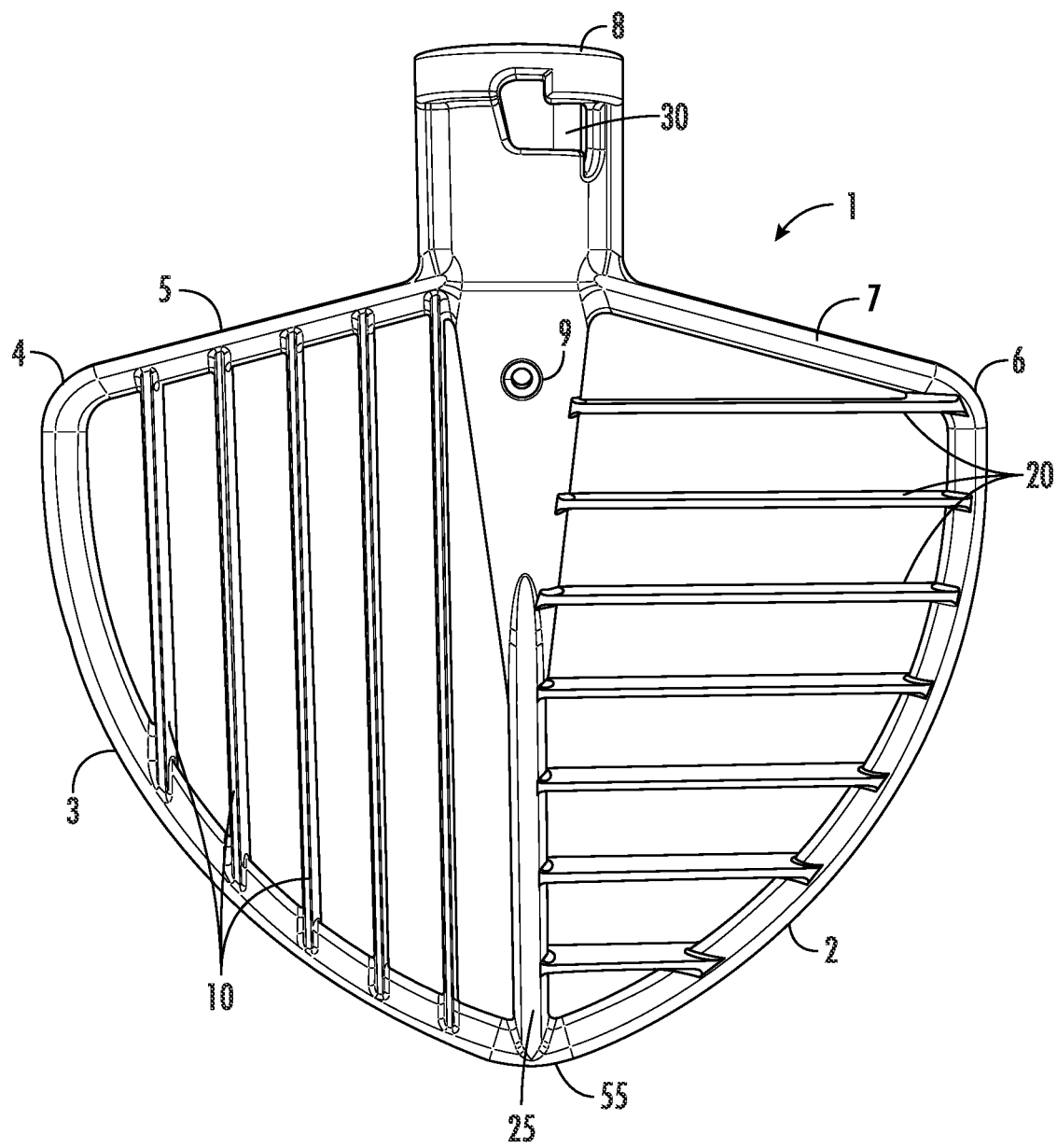
FIGS. 1A and 1B are identical front views of the present invention, a mixing paddle.

The following descriptions are not meant to limit the invention, but rather to add to the summary of invention, and illustrate the present invention, a mixing paddle. The present invention is illustrated with a variety of drawings showing the primary embodiments of the present invention, with various diagrams and figures explaining its workings.

Certain terminology is used in the following description for convenience only and is not limiting. The article "a" is intended to include one or more items, and where only one item is intended the term "one" or similar language is used. To assist in the description of the present invention, words such as short, long, top, bottom, side, upper, lower, front, rear, inner, outer, right and left are used to describe the relative size and orientation of the present invention, a mixing paddle, with respect to the accompanying figures. The terminology includes the words above specifically mentioned, derivatives thereof, and words of similar import.

The following detailed description refers to the accompanying drawings. Wherever possible, the same reference numbers are used in the drawings and the following description to refer to the same or similar elements. The embodiments of the claimed subject matter may be described, modified, and adapted, and other implementations are possible. For example, substitutions, additions, or modifications, which perform identical functions to the embodiments disclosed, may be made to the elements illustrated in the drawings. Accordingly, the following detailed description does not limit the claimed subject matter. The proper scope of the claimed subject matter is defined by the claims contained herein. The claimed subject matter improves over the prior art by providing a mixing paddle that more nearly mimics a pastry cutter.

Figure 1B:
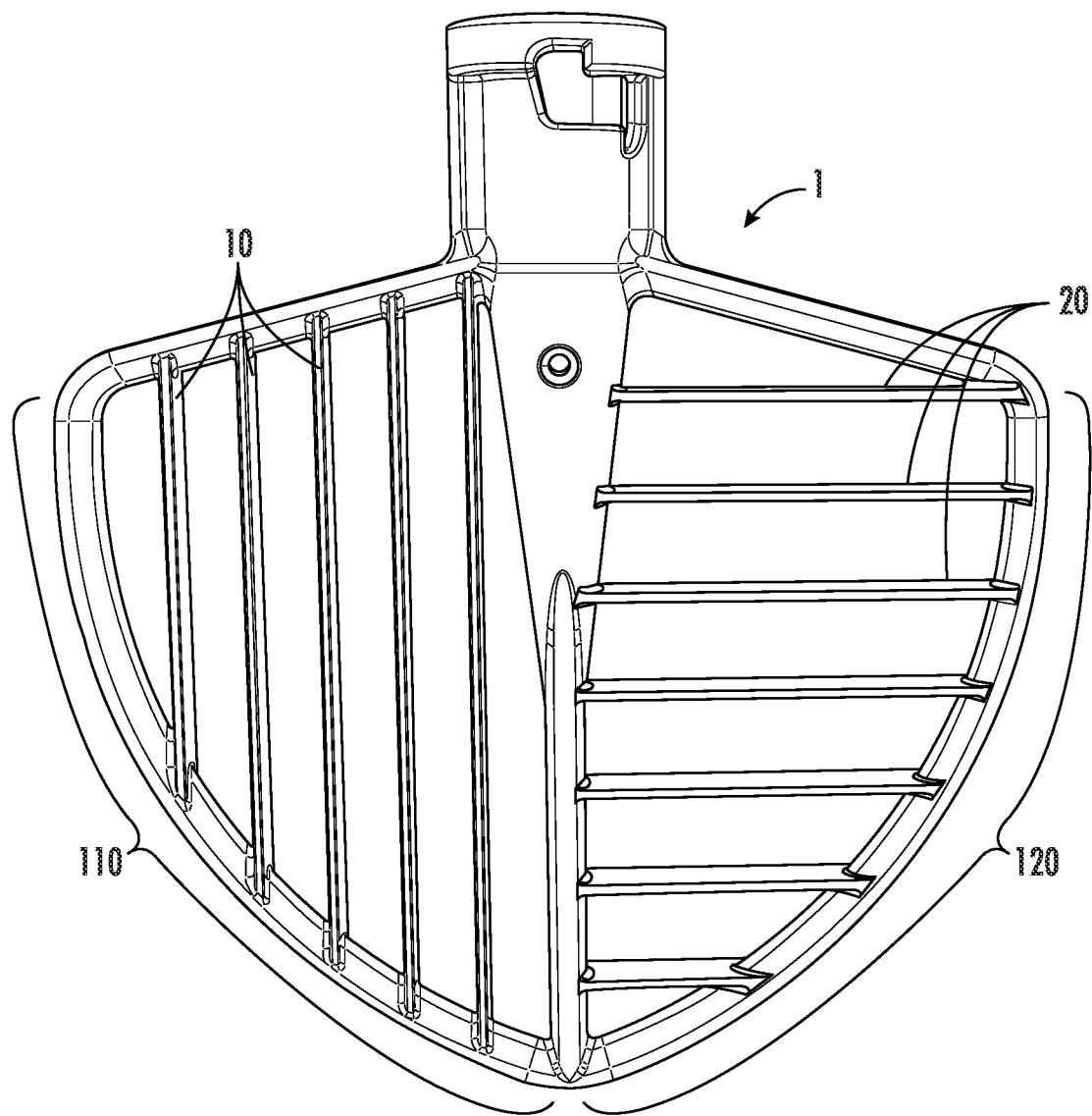
Figure 2:
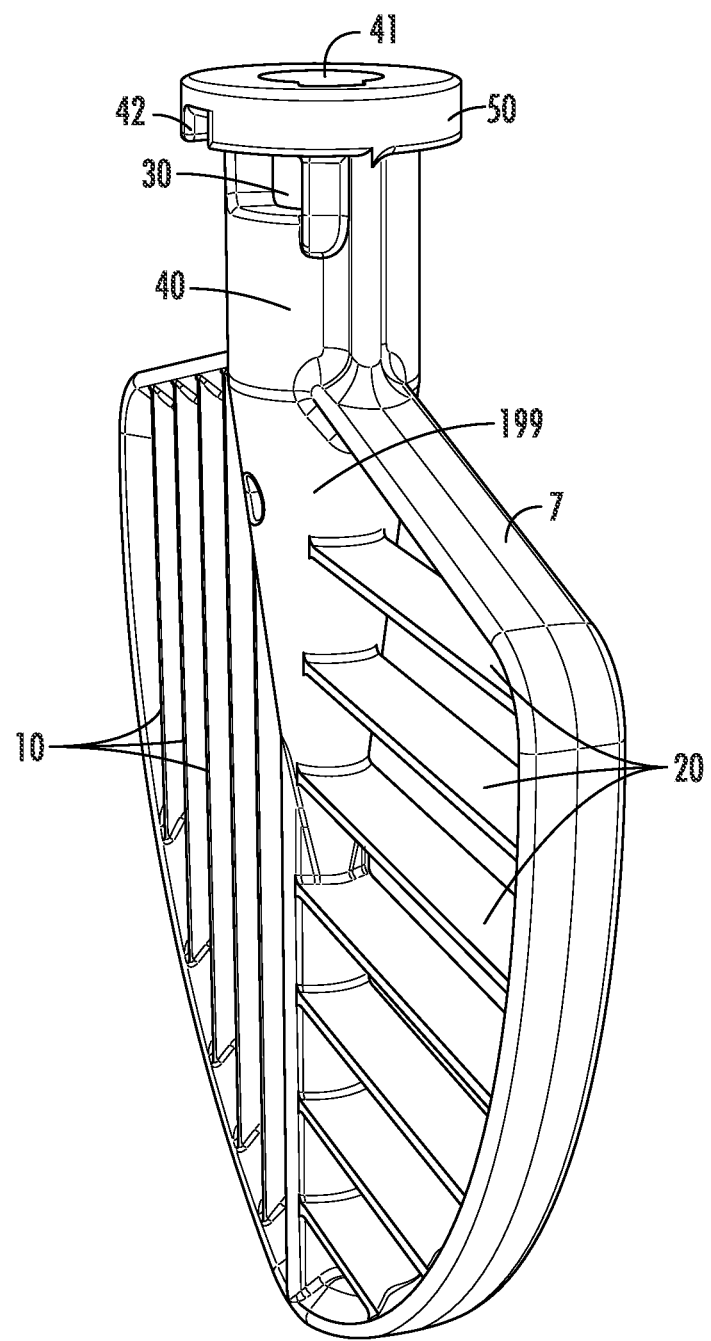
FIG. 2 is a perspective view of the present invention.

FIGS. 1A, 1B, and 2 show the present invention, a mixing paddle 1. The mixing paddle 1 has a compound, integral center shaft integrally comprised of a flange 8, 50, a collar 40, a frustoconical member 199, and a spine 25. For reference, the flange 8 is at the top of the compound, integral center shaft 8, 50, 40, 199, 25. For reference, the spine 25 is at the bottom of the compound, integral center shaft 8, 50, 40, 199, 25. The flange 8, 50 has a top surface 8, and a side surface 50. The flange 8, 50 is integral with the collar 40. The rotatable beater shaft containing a mating element from a mixing machine fits through an opening 41 in the top surface 8 of the flange 8, 50. The flange 8, 50 and collar 40 share an opening 42, 30 through which the mating element on the rotatable beater shaft from a mixing machine fits and locks. A lock nut 9 in the frustoconical member 199 can be tightened to lock the mating element from the mixing machine in place. The flange 8, 50 and collar 40 represent a generalized form that may in alternate embodiments include holes, splines, additional flanges and other structures known in the art to be suitable for attaching the mixing paddle 1 to a beater shaft of a stand mixer, or to a hand mixer or other mixing device.

The collar 40 is integral with the frustoconical member 199. The frustoconical member 199 is integral with the spine 25.

A rim 5, 4, 3, 2, 6, 7 is bisected by the compound, integral center shaft 8, 50, 40, 199, 25, and is integrally attached to the compound, integral center shaft 8, 50, 40, 199, 25 in at least two locations. The compound, integral center shaft 8, 50, 40, 199, 25, as shown in FIGS. 1A, 1B, and 2, bisects the rim 5, 4, 3, 2, 6, 7 into two substantially equal halves 5, 4, 3 and 7, 6, 2. The rim members 5, 7 integrally attach with the top of the compound, integral center shaft 8, 50, 40, 199, 25 at the transition from the collar 40 to the frustoconical member 99. Additionally, the rim members 2, 3 integrally attach with the compound, integral center shaft 8, 50, 40, 199, 25 at the bottom 55 of the spine 25. The rim is formed from piece-wise members 5, 4, 3, 2, 6, 7 that are thin, flat, and wide. The rim 5, 4, 3, 2, 6, 7 is symmetrical about the compound, integral center shaft 8, 50, 40, 199, 25. When viewed from the front, this embodiment resembles a scutiform 5, 4, 3, 2, 6, 7 or shield 5, 4, 3, 2, 6, 7. The rim 5, 4, 3, 2, 6, 7 may take any number of shapes, but it needs to conform to the sides of a standard mixing bowl used with a stand mixer or hand mixer.

The rim 5, 4, 3, 2, 6, 7 has two sides disposed opposite one another on each side of the compound, integral center shaft 8, 50, 40, 199, 25. In the embodiment shown in FIGS. 1A, 1B, and 2, the first side 2, 6, 7 of the rim is disposed to the right of the compound, integral center shaft 8, 50, 40, 199, 25 and the second side 5, 4, 3 is disposed to the left side of the compound, integral center shaft 8, 50, 40, 199, 25. The first side 2, 6, 7 of the rim is disposed on the opposite side of the compound, integral center shaft 8, 50, 40, 199, 25 from the second side 5, 4, 3. The terms "first side" and "second side" are arbitrary and may be reversed.

The rim 5, 4, 3, 2, 6, 7 has two substantially lateral members 5, 7, disposed opposite one another about, and connecting to, the compound, integral center shaft 8, 50, 40, 199, 25. The rim 5, 4, 3, 2, 6, 7 connects to the compound, integral center shaft 8, 50, 40, 199, 25 at the intersection of the collar 40, and the frustoconical member 199. The substantially lateral member 5 is also connected to a filleted transition member 4; the substantially lateral member 7 is also connected to a filleted transition member 6. The filleted transition member 4 is also connected to a curved member 3. The filleted transition member 6 is also connected to the curved member 2. The two curved members 2, 3 join together 55 at the bottom of the compound, integral center shaft 55. The two curved members 2, 3 are contoured to match the sides of a standard mixing bowl, which is well-known in the prior art. The spine 25 is integrally joined where the two curved piece-wise members 3, 2 meet at the bottom of the spine 55. The bottom of the spine 55, where the spine 25 and the two piece-wise members 3, 2 meet, may resemble an apex, if the curvature is discontinuous between 2 and 3 where they meet 55; or the bottom 55 of the spine 25 and the two piece-wise members 3, 2 may smooth, if the curvature is continuous.

In FIGS. 1A, 1B, and 2, a first 120 plurality of parallel blades 20 are disposed to the right of the compound, integral center shaft 8, 50, 40, 199, 25, between the compound, integral center shaft 8, 50, 40, 199, 25 and the first side 2, 6, 7 of the rim. A second 110 plurality of parallel blades are disposed to the left of the compound, integral center shaft 8, 50, 40, 199, 25, between the compound, integral center shaft 8, 50, 40, 199, 25 and the second side 5, 4, 3 of the rim Each of the first 120 plurality of parallel blades 20 are parallel with one another 20. Each of the second 110 plurality of parallel blades 10 are parallel with one another 10. Each of the first 120 plurality of parallel blades 20 is attached to one or more of the members of the first side of the rim 2, 6, 7. Each of the second 110 plurality of parallel blades 10 is attached to one or more of the members of the second side of the rim 5, 4, 3. The first 120 plurality of parallel blades 20 is located exactly across the compound, integral center shaft 8, 50, 40, 199, 25 from the second 110 plurality of parallel blades 10, and is not offset towards the top or the bottom of the compound, integral center shaft 8, 50, 40, 199, 25 when compared to the second 110 plurality of parallel blades 10.

In the first 120 plurality of parallel blades 20, one end of each of the blades 20 is attached to the compound, integral center shaft 8, 50, 40, 199, 25 at or below the frustoconical member 99. The other end of each of the blades 20 is attached to either the curved member 2 or the filleted transition member 6. With this orientation of the first 120 plurality of parallel blades, it is not practical to attach an end of any blade 20 to the substantially lateral member 7.

In the second 110 plurality of parallel blades 10, one end of each of the blades 10 is attached to the substantially lateral member 5, while the other end of each of the blades 10 is attached to the curved member 3.

Figure 3:
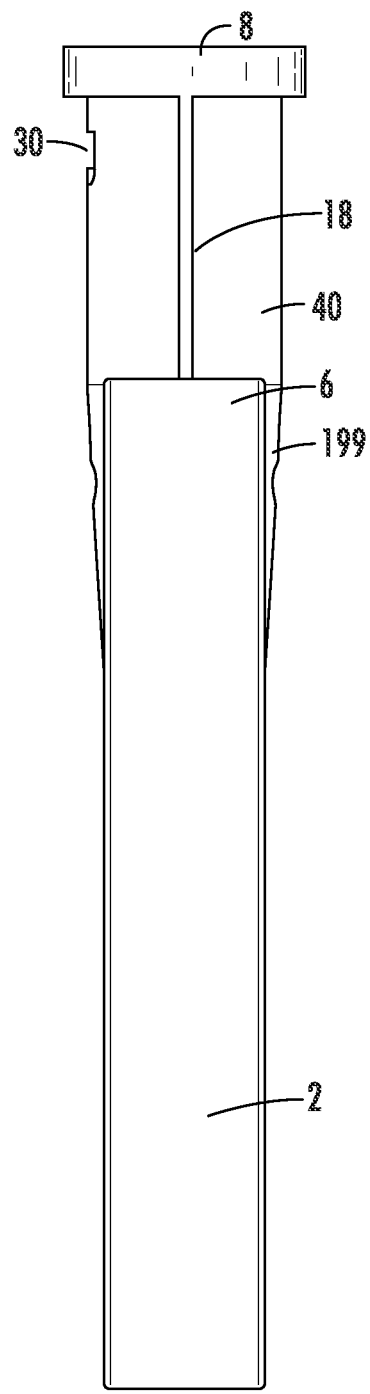
FIG. 3 is a side view of the present invention.
Figure 4:
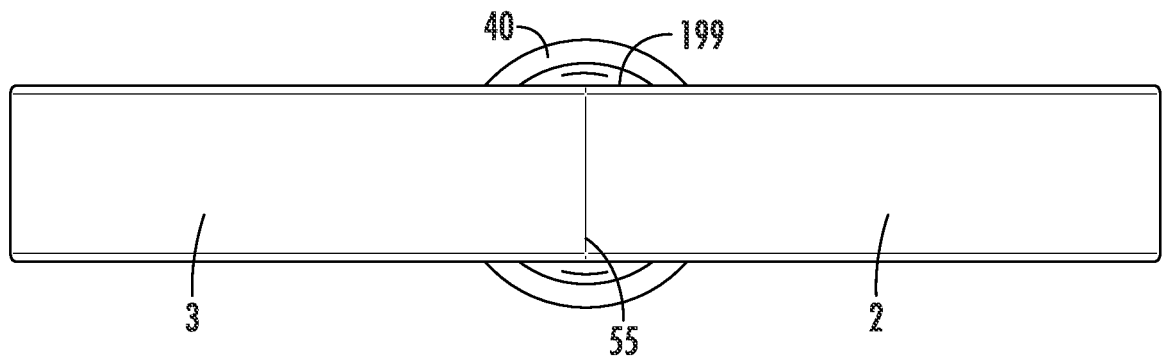
FIG. 4 is a bottom view of the present invention.
Figure 5:
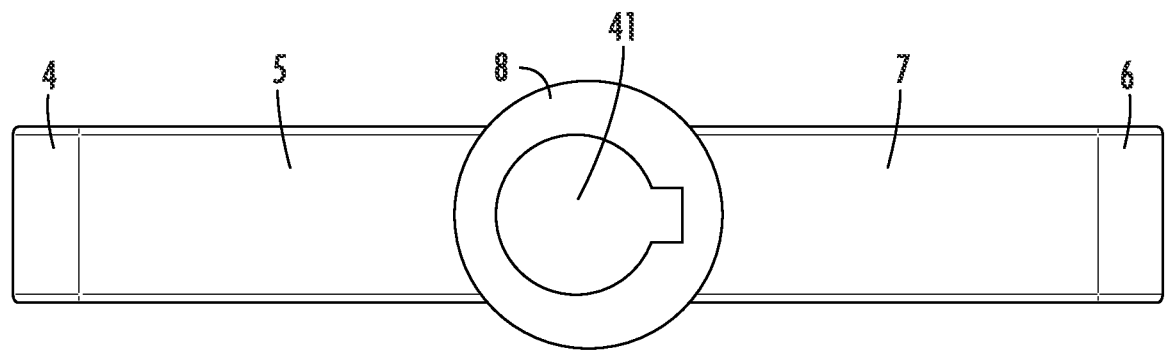
FIG. 5 is a top view of the present invention.
Figure 6:
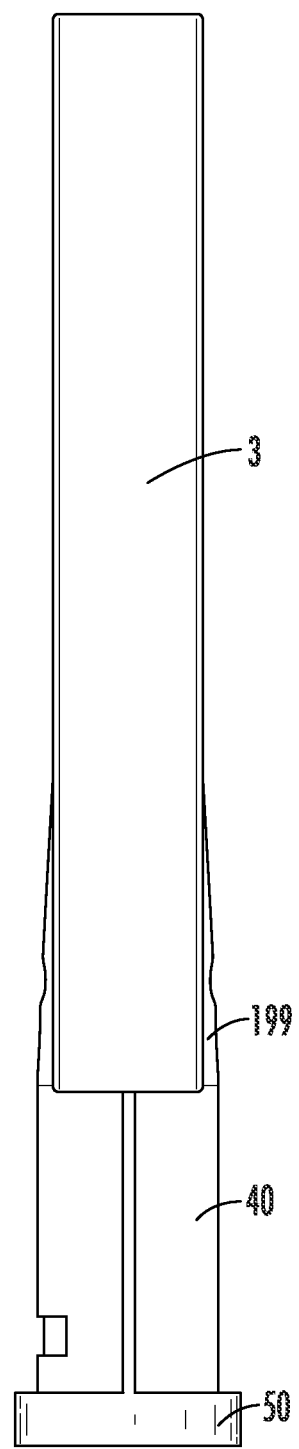
FIG. 6 is a side view rotated 180° from FIG. 3.

FIGS. 3-6 show the top (FIG. 5), bottom (FIG. 4), and sides (FIGS. 3 and 6) of the present invention 1. In FIG. 3, in the first side view, the flange 8, collar 40, and opening 30 are visible at the top. The periphery of the frustoconical member 199 is visible from the side. The filleted transition member 6 and curved member 2 are also shown. A flange 8 support 18 connects the flange 8 to the rim 5, 4, 3, 2, 6, 7 at the substantially lateral member 7. In FIG. 6, in the second side view, the flange 50, collar 40, frustoconical member 199, and curved member 3 are visible.

FIG. 4 shows a bottom view, with the connection 55 of the two curved members 2, 3; the collar 40, and the frustoconical member 199. FIG. 5 shows a top view, with the top surface 8 of the flange 8. The substantially lateral members 5, 7, and the filleted transition members 4, 6 of the rim 5, 4, 3, 2, 6, 7 are visible from a top view. The opening 41 through which the mating element of the beater shaft from the mixing machine fits is also visible in this view.

The present invention, a mixing paddle 1 is intended to produce results similar with, or superior to, manually using a pastry cutter. The mixing paddle 1 is attached to the beater shaft of a mixer by passing the beater shaft through the opening 41 in the top surface of the flange 8. The beater shaft has a mating element that mates with an opening 30, 42 in the flange 50 and collar 40. The beater shaft can be locked in place using the lock nut 9. When the beater shaft of the mixing machine rotates, the mixing paddle 1 rotates.

Figure 7:
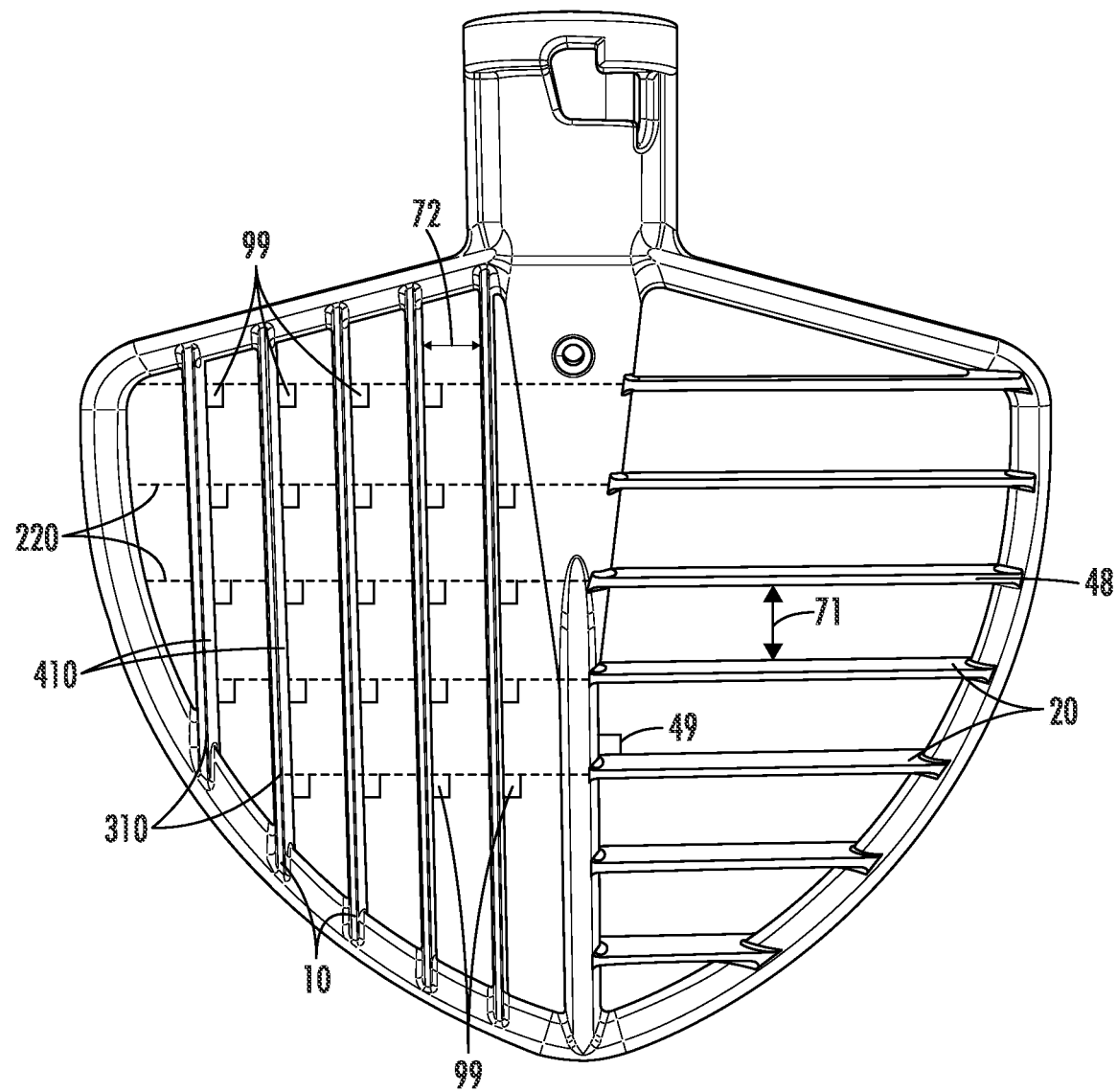
FIG. 7 is a front view of the present invention, showing the orthogonal relationship between the two sets of parallel blades.

In FIG. 7, the relationship between the two pluralities 110, 120 of parallel blades 10, 20 is shown. Each blade has two edges 310 and two wide surfaces 410. The edges 310 of adjoining parallel blades 10, 20 are aligned. The wide surfaces 410 of adjoining parallel blades 10, 20 face one another. The edges 310 and wide surfaces 410 of adjoining parallel blades 10, 20 are, in all respect, parallel with one another. Projecting 220 the blades 20 from the first plurality 120 of parallel blades 20, until the projection lines 220 intersect[s] the blades 10 from the second plurality 110 of parallel blades 10 shows that the two pluralities 110, 120 of parallel blades 10, 20 are substantially orthogonal to one another, meaning that the angle 99 is approximately 90°. Although the angle 99 does not have to be precisely 90°, for best results it should be close. In all cases, the angle 99 should be between 80° and 100°, or roughly within 10% of being truly orthogonal. Preferably, the angle should be between 85° and 95°, or roughly within 5% of being truly orthogonal. In this embodiment, the first plurality 120 of parallel blades 20 creates an angle 49 with the spine 25 of the compound, integral center shaft 8, 50, 40, 199, 25. In this embodiment, the angle 49 is 90°. The first plurality 120 of parallel blades 20 have a definable spacing 71, which is uniform. The definable spacing 71 of the first plurality 120 of parallel blades 20 does not need to be uniform. The second plurality 110 of parallel blades 10 have a definable spacing 72, which is uniform. The definable spacing 72 of the second plurality 110 of parallel blades 10 does not need to be uniform. The definable spacing 71, 72 of the blades 20, 10 is ideally between 6 mm and 13 mm. The edge 48 of the blades 20, 10 are uniform in this embodiment.

Figure 8:
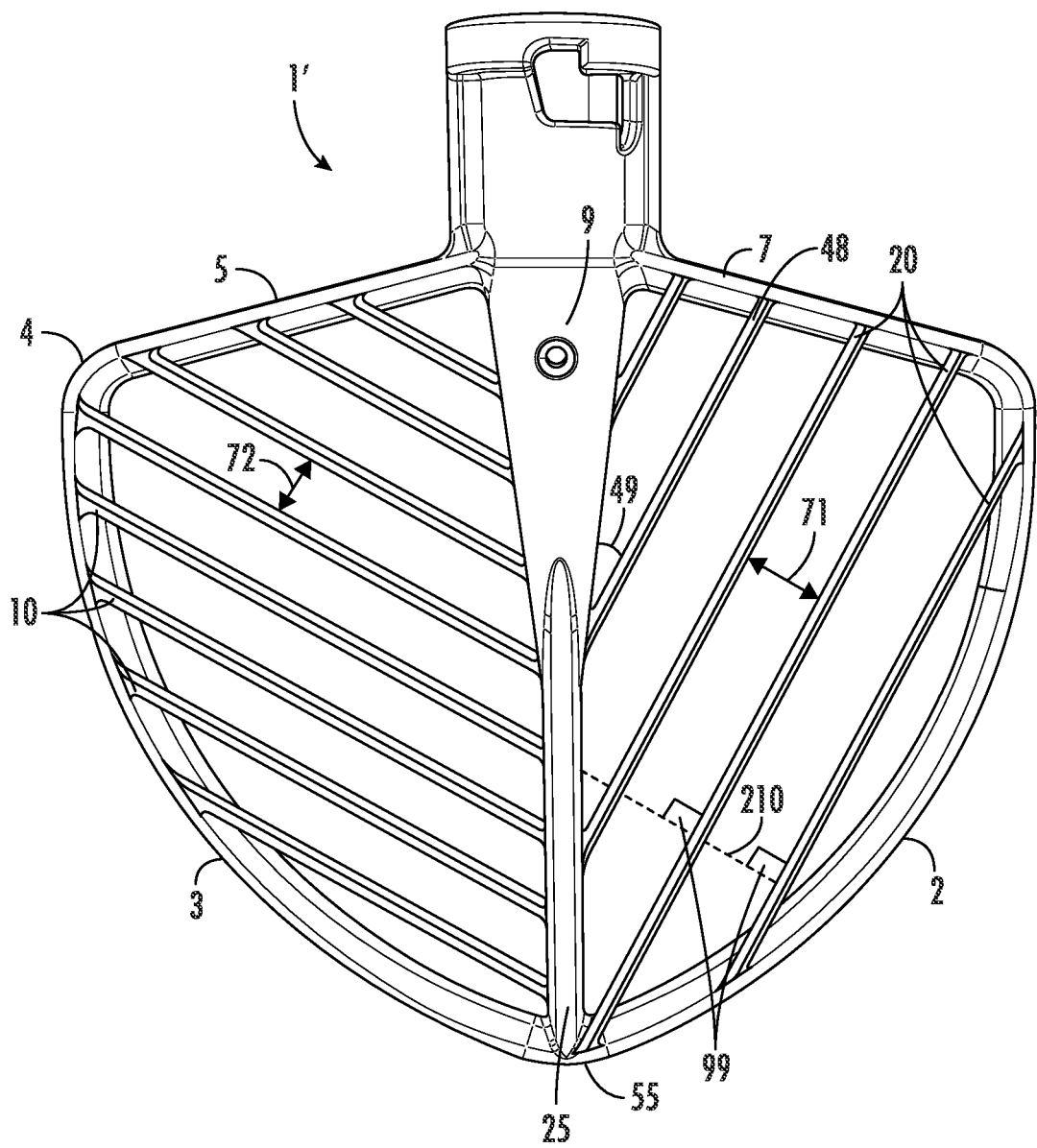
FIG. 8 is an alternative embodiment of the present invention.

FIG. 8 shows an alternative embodiment of the mixing paddle 1'. This embodiment still has a rim 5, 4, 3, 2, 6, 7 formed from piece-wise members rim 5, 4, 3, 2, 6, 7 and resembling a scutiform or shield 5, 4, 3, 2, 6, 7. In this figure, the relationship between the first plurality 120 of parallel blades 20 and the second plurality 110 of parallel blades 10 is made with a projection line 210 defining the angle 99 between the two pluralities 110, 120. The angle 99 shows that the two pluralities 110, 120 of parallel blades 10, 20 are substantially orthogonal to one another. Although the angle 99 does not have to be precisely 90°, for best results it should be close. In all cases, the angle 99 should be between 80° and 100°, or roughly within 10% of orthogonal. Preferably, the angle should be between 85° and 95°, or roughly within 5% of orthogonal. In this embodiment, the first plurality 120 of parallel blades 20 creates an angle 49 with the frusto-conical member 199 of the compound, integral center shaft 8, 50, 40, 199, 25. In this embodiment, the angle 49 is acute. Likewise, the angle 49 could be obtuse or zero. If the angle 49 is 0° or 180°, it means that the blades 20 of the first plurality 120 of parallel blades 20 are parallel to the compound, integral center shaft 8, 50, 40, 199, 25. When this angle 49 is 0° or 180°, the second plurality 110 of parallel blades 10 is attached to both the second side 5, 4, 3 of the rim and to the compound, integral center shaft 8, 50, 40, 199, 25. When this angle is 90°, the first plurality 120 of parallel blades 20 is attached to both the first side of the rim 7, 6, 2 and to the compound, integral center shaft 8, 50, 40, 199, 25. When this angle is acute or obtuse, both the first 120 and second 110 plurality of parallel blades 10, 20 are attached to both the rim 7, 6, 5, 4, 3, 2 and the compound, integral center shaft 8, 50, 40, 199, 25.

The first plurality 120 of parallel blades 20 has a definable spacing 71, which is uniform in this illustrated embodiment. The definable spacing 71 of the first plurality 120 of parallel blades 20 does not need to be uniform. The second plurality 110 of parallel blades 10 has a definable spacing 72, which is uniform in this illustrated embodiment. The definable spacing 72 of the second plurality 110 of parallel blades 10 does not need to be uniform. The edge 48 of the blades 20, 10 are uniform in this embodiment.

Figure 9A:
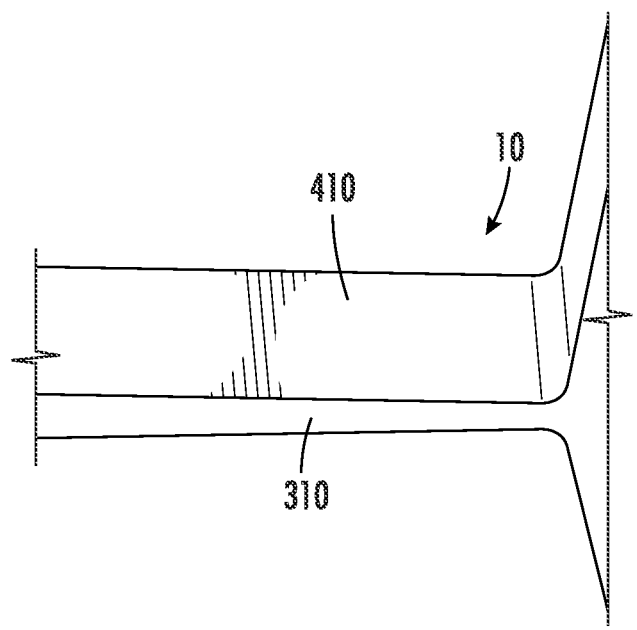
FIG. 9A shows an isolation of a non-uniform edge that is tapered.
Figure 9B:
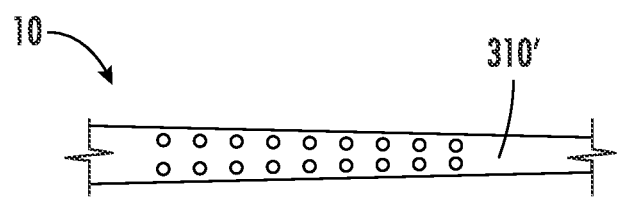
FIG. 9B shows an isolation of a non-uniform edge that is tapered and roughened.

FIGS. 9A and 9B show alternative blades 10, 20, wherein the edge 310 is not uniform. Each blade has two edges 310 and two wide surfaces 410. In FIG. 9A, the edge 310 can be tapered. In FIG. 9B, the edge 310' is both tapered and roughened. Roughening the edge 310' can help create fat chunks of varied sizes and with irregular surfaces. Tapering the non-uniform edge 310, 310' can facilitate the cutting of the fat chunks, which can also be advantageous. As the beater shaft of a mixing machine rotates the mixing paddle 1 rotates through ingredients, the roughened edge 310' of the blades tend to drag fat chunks along rather than slicing through them cleanly, thereby promoting better mixing. Evenly sized fat chunks that are well-distributed in pastry dough produce flakiness in a baked pie crust.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A pastry paddle for use with an electric mixer comprising:
   a shaft, having a top and a bottom, and defining an axis about which the pastry paddle rotates;
   a collar for affixing the pastry paddle to an electric mixer;
   a first plurality of blades, each blade having two edges, two wide surfaces, a first end, and a second end;
   a second plurality of blades, each blade having two edges, two wide surfaces, a first end, and a second end; and
   a continuous peripheral rim;
   wherein the continuous peripheral rim, the collar, and the top of the shaft are joined together at a junction, with the shaft bisecting the continuous peripheral rim;
   wherein the shaft has a first side and a second side, the first side and second side being disposed opposite of one another;
   wherein the first plurality of blades is disposed on the first side of the shaft, each of the blades in the first plurality of blades is parallel with one another, and at least one end of each blade in the first plurality of blades is attached directly to the continuous peripheral rim;
   wherein the second plurality of blades is disposed on the second side of the shaft, each of the blades in the second plurality of blades is parallel with one another, each of the blades in the second plurality of blades is perpendicular with each blade in the first plurality of blades, and at least one end of each blade in the second plurality of blades is attached directly to the continuous peripheral rim; and
   wherein the continuous peripheral rim completely encloses each and every blade in both the first plurality of blades and the second plurality of blades.

2. A pastry paddle for use with an electric mixer comprising:
   a shaft, having a top and a bottom, and defining an axis about which the pastry paddle rotates;
   a collar for affixing the pastry paddle to an electric mixer;
   a totality of blades, consisting of the entirety of the blades in the paddle, each blade consisting of two edges, two wide surfaces, a first end, and a second end; and
   a continuous peripheral rim, completely surrounding and enclosing the totality of blades;
   wherein the continuous peripheral rim, the collar, and the top of the shaft are joined together at a junction, with the shaft bisecting the continuous peripheral rim;
   wherein the shaft has a first side and a second side, the first side and second side being disposed opposite of one another;
   wherein the totality of blades can be separated into two distinct pluralities of blades;
   wherein a first plurality of blades is disposed on the first side of the shaft, each of the blades in the first plurality of blades is parallel with one another, and at least one end of each blade in the first plurality of blades is attached directly to the continuous peripheral rim; and wherein a second plurality of blades is disposed on the second side of the shaft, each of the blades in the second plurality of blades is parallel with one another, each of the blades in the second plurality of blades is perpendicular with each blade in the first plurality of blades, and at least one end of each blade in the second plurality of blades is attached directly to the continuous peripheral rim.

3. A pastry paddle for use with an electric mixer comprising:
   a totality of blades, consisting of the entirety of the blades in the paddle, each blade having two edges, two wide surfaces, a first end, and a second end;
   a continuous peripheral rim, completely surrounding and enclosing the totality of blades; and
   an integral collar and shaft, defining an axis about which the pastry paddle rotates and bisecting the continuous peripheral rim;
      wherein the continuous peripheral rim and the integral collar and shaft are joined together at a junction, which defines the transition between the collar and the shaft, with the collar being outside the continuous peripheral rim and the shaft being inside the continuous peripheral rim;
      wherein the shaft has a first side and a second side, the first side and second side being disposed opposite of one another;
      wherein each and every blade in the totality of blades belongs to either a first plurality of blades or a second plurality of blades;
      wherein the first plurality of blades is disposed on the first side of the shaft, each of the blades in the first plurality of blades is parallel with one another, and at least one end of each blade in the first plurality of blades is attached directly to the continuous peripheral rim; and
      wherein a second plurality of blades is disposed on the second side of the shaft, each of the blades in the second plurality of blades is parallel with one another, each of the blades in the second plurality of blades is perpendicular with each blade in the first plurality of blades, and at least one end of each blade in the second plurality of blades is attached directly to the continuous peripheral rim.

4. The pastry paddle for use with an electric mixer of claim 3 wherein the continuous peripheral rim is formed from piece-wise members.

5. The pastry paddle for use with an electric mixer of claim 3, wherein the continuous peripheral rim is contoured so as to conform to the sides of a standard mixing bowl.

6. The pastry paddle for use with an electric mixer of claim 3, wherein the continuous peripheral rim is symmetrical about the shaft.

7. The pastry paddle for use with an electric mixer of claim 3, wherein the continuous peripheral rim has the shape of a scutiform.

8. The pastry paddle for use with an electric mixer of claim 3, wherein the shaft extends downward from the junction and intersects the continuous peripheral rim.

9. The pastry paddle for use with an electric mixer of claim 8, wherein at least one end of each blade in the first plurality of blades is attached directly to the shaft.

10. The pastry paddle for use with an electric mixer of claim 9, wherein at least one end of each blade in the second plurality of blades is attached directly to the shaft.

11. The pastry paddle for use with an electric mixer of claim 3, wherein each of the first plurality of blades is perpendicular to the shaft.

12. The pastry paddle for use with an electric mixer of claim 3, wherein the first plurality of blades is disposed between the first side of the shaft and the continuous peripheral rim.

13. The pastry paddle for use with an electric mixer of claim 12, wherein the second plurality of blades is disposed between the second side of the shaft and the continuous peripheral rim.

14. The pastry paddle for use with an electric mixer of claim 3, wherein a definable spacing exists both the first plurality of parallel blades and the second plurality of parallel blades.

15. The pastry paddle for use with an electric mixer of claim 14, wherein the definable spacing is between 6 mm and 13 mm.

16. The pastry paddle for use with an electric mixer of claim 15, wherein the definable spacing between each blade in the first plurality of parallel blades and the second plurality of parallel blades is uniform.

17. The pastry paddle for use with an electric mixer of claim 3, where each edge of the totality of blades is roughened.

18. The pastry paddle for use with an electric mixer of claim 3, where each edge of the totality of blades is tapered.

19. The pastry paddle for use with an electric mixer of claim 3, where each edge of the totality of blades is both roughened and tapered.

* * * * *